(12) United States Patent
Christoff et al.

(10) Patent No.: US 7,912,909 B2
(45) Date of Patent: Mar. 22, 2011

(54) PROCESSING ENCUMBERED ELECTRONIC COMMUNICATIONS

(75) Inventors: Max Benjamin Christoff, Berkley, CA (US); Denis Khodak, Jersey City, NJ (US); Bedros Magardich Magardichian, Rego Park, NY (US); Andrew Sherman, New York, NY (US)

(73) Assignee: Morgan Stanley, New York, NY (US)

( * ) Notice: Subject to any disclaimer, the term of this patent is extended or adjusted under 35 U.S.C. 154(b) by 60 days.

(21) Appl. No.: 11/528,727

(22) Filed: Sep. 27, 2006

(65) Prior Publication Data

US 2007/0106904 A1   May 10, 2007

Related U.S. Application Data

(60) Provisional application No. 60/720,873, filed on Sep. 27, 2005.

(51) Int. Cl.
*G06F 15/16* (2006.01)
*G06F 15/173* (2006.01)
*G06F 17/00* (2006.01)

(52) U.S. Cl. ........ 709/206; 709/204; 709/223; 709/224; 707/667

(58) Field of Classification Search .......... 709/204–207, 709/223–226; 707/665–668; 713/183
See application file for complete search history.

(56) References Cited

U.S. PATENT DOCUMENTS

| | | | |
|---|---|---|---|
| 6,584,564 B2 * | 6/2003 | Olkin et al. | 713/152 |
| 6,839,741 B1 * | 1/2005 | Tsai | 709/217 |
| 6,968,348 B1 * | 11/2005 | Carone et al. | 707/203 |
| 7,080,260 B2 * | 7/2006 | Johnson | 713/193 |
| 2002/0007453 A1 * | 1/2002 | Nemovicher | 713/155 |
| 2002/0010743 A1 * | 1/2002 | Ryan et al. | 709/205 |
| 2002/0112015 A1 * | 8/2002 | Haynes | 709/206 |
| 2002/0178353 A1 * | 11/2002 | Graham | 713/151 |
| 2003/0182559 A1 | 9/2003 | Curry et al. | |
| 2003/0236763 A1 * | 12/2003 | Kilduff | 707/1 |
| 2005/0138353 A1 * | 6/2005 | Spies et al. | 713/153 |
| 2005/0222985 A1 * | 10/2005 | Buchheit et al. | 707/3 |
| 2006/0010322 A1 * | 1/2006 | Novack et al. | 713/170 |
| 2007/0067399 A1 * | 3/2007 | Kulkarni et al. | 709/206 |

OTHER PUBLICATIONS

International Search Report for International Application PCT/US 06/37960 dated May 2, 2008.
Written Opinion of the International Search Authority for International Application PCT/US06/37960 dated May 2, 2008.

* cited by examiner

*Primary Examiner* — Joshua Joo
(74) *Attorney, Agent, or Firm* — K&L Gates LLP

(57) ABSTRACT

The invention includes, in various embodiments, a method for archiving an electronic message which includes the steps of scanning the electronic message to determine whether at least a portion of the message is encumbered, disencumbering the encumbered portion of the message if it is encumbered, storing a copy of the disencumbered electronic message, and transmitting the electronic message to a recipient. Once stored, the disencumbered message can be accessed and reviewed by a supervisor, for example, without having to request a password from the sender or recipient. Encumbered messages include messages, or portions of messages, which are password protected, encrypted, and/or otherwise structured to prohibit unauthorized access thereto.

18 Claims, 3 Drawing Sheets

PROCESSING ENCUMBERED ELECTRONIC COMMUNICATIONS

PRIORITY

This application claims the benefit under 35 U.S.C. §119 (e) of U.S. Provisional Patent Application Ser. No. 60/720,873, entitled PROCESSING ENCRYPTED E-MAIL COMMUNICATIONS, filed on Sep. 27, 2005, the entire disclosure of which is hereby expressly incorporated by reference herein.

FIELD OF THE INVENTION

The present invention generally relates to analyzing and processing information associated with electronic communications. The invention more particularly relates to processing encrypted or password-protected e-mail communications and their associated attachments.

BACKGROUND

Financial services firms, along with many other companies in regulated industries, are subject to laws or regulations that require archival, supervisory review, and searching of e-mail communications. Also, there are established business processes that require the use of encrypted documents due to the sensitive nature of the content.

Various conventional technologies exist to allow parties to exchange e-mails in encrypted form. These technologies include public key cryptography (PKI) and Secure/Multipurpose Internet Mail Extensions (S/MIME), which require parties to exchange keys or install certificates; "gateway" transport-layer security (TLS) solutions, which typically require e-mail system administrators to make substantial modifications to their e-mail systems; and, proprietary e-mail application plug-ins or web-based interfaces, which usually require recipients to install new software to open documents and e-mails, or to visit a web site to download the attachments. Participants in encrypted e-mail communications may also use native password/encryption facilities available at the time of document creation. These facilities may be found as tools within word processing programs, spreadsheet programs, and charting/presentation programs, for example.

The use of encryption or password protection, however, often creates challenges for compliance with applicable laws or regulations that govern the processing of e-mail communications. Compliance officers who need to browse archives, or supervisors who need to review e-mails, can request that users supply passwords or decrypted documents. When documents are needed by such officers or supervisors, however, the users may no longer be employed by the firm, may have forgotten the passwords, or may otherwise not wish to assist in the effort to search for or review encrypted documents. In addition, firms may wish to monitor or investigate user e-mail communications discreetly, and asking users for passwords can jeopardize the discreet nature of such activity. Also, archive-wide searching of encrypted documents is usually impossible, because search tools are typically unable to scan the content of such documents.

In view of the foregoing issues and deficiencies, more efficient and effective ways are required for processing and storing encrypted e-mail communications and their attachments.

SUMMARY

The invention includes, in various embodiments, a method for archiving an electronic message which includes the steps of scanning the electronic message to determine whether at least a portion of the message is encumbered, disencumbering the encumbered portion of the message if it is encumbered, storing a copy of the disencumbered electronic message, and transmitting the electronic message to a recipient. Once stored, the disencumbered message can be accessed and reviewed by a supervisor, for example, without having to request a password from the sender or recipient. Encumbered messages include messages, or portions of messages, which are password protected, encrypted, and/or otherwise structured to prohibit unauthorized access thereto. Disencumbering such encumbered messages includes using any suitable method, process, and/or apparatus for making the encumbered messages intelligible such as, for example, using passwords to unlock password protected documents and/or using cryptographic software to decipher encrypted documents.

The invention also includes, in various embodiments, a computer-readable medium including computer-executable instructions thereon for scanning an electronic message to determine whether at least a portion of the electronic message is encumbered, the electronic message having a sender and a recipient, disencumbering the encumbered portion of the electronic message if it is encumbered, storing a copy of the electronic message in a disencumbered format; and transmitting the electronic message to the recipient.

The invention also includes, in various embodiments, a computer-assisted system for archiving an electronic message comprising an encryption management module for scanning an electronic message to determine whether at least a portion of the electronic message is encumbered, the electronic message having a sender and a recipient, disencumbering the encumbered portion of the electronic message if it is encumbered, and transmitting the electronic message to the recipient; and an electronic archive for storing a copy of the electronic message in a disencumbered format.

The invention also includes, in various embodiments, a microprocessor including computer-executable instructions thereon for scanning an electronic message to determine whether at least a portion of the electronic message is encumbered, the electronic message having a sender and a recipient, disencumbering the encumbered portion of the electronic message if it is encumbered, storing a copy of the electronic message in a disencumbered format, and transmitting the electronic message to the recipient.

BRIEF DESCRIPTION OF THE FIGURES

The utility of the embodiments of the invention will be readily appreciated and understood from consideration of the following description of the embodiments of the invention when viewed in connection with the accompanying drawings, wherein.

Figure 1:
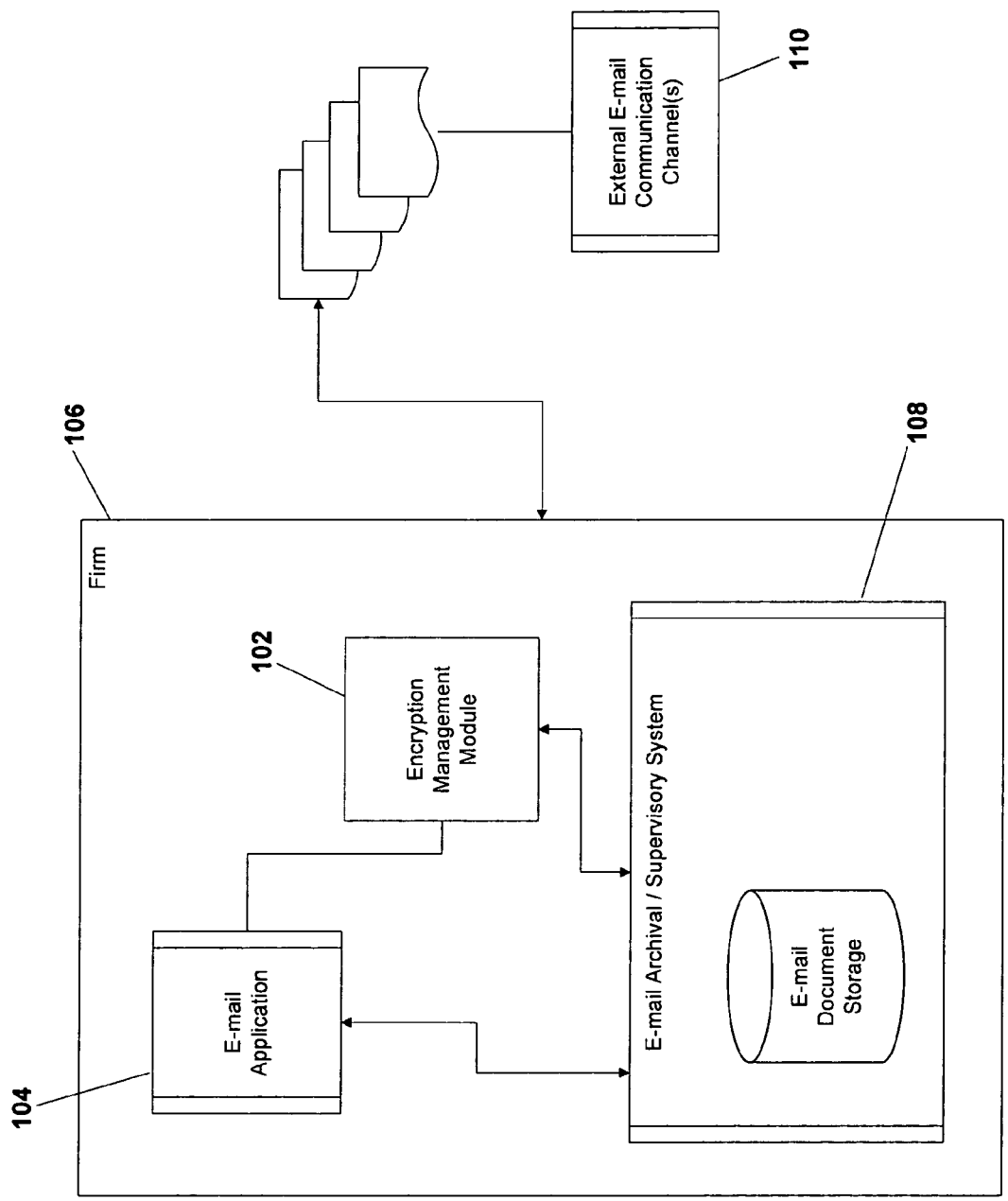
FIG. 1 includes a sample architecture diagram illustrating various examples of system embodiments provided in association with the invention.

Corresponding reference characters indicate corresponding parts throughout the several views. The exemplification set out herein illustrates preferred embodiments of the invention, in various forms, and such exemplifications are not to be construed as limiting the scope of the invention in any manner.

DESCRIPTION

Embodiments of the invention allow users to send or receive e-mails with encrypted attachments while preserving copies of the e-mails with attachments in an unencrypted form for supervisory review and/or archival purposes. As discussed below, attachments can be sent in their native form (e.g., as a word processing document, a spreadsheet, or a presentation) without requiring substantial change in the behavior of recipients and without requiring new software installation by e-mail recipients. For example, recipients may continue to open password-protected documents in standard word processing, spreadsheet, and presentation programs and use those programs to enter passwords, rather than learning a new system, launching a different program, visiting a web-based service, and so forth.

Figure 2:
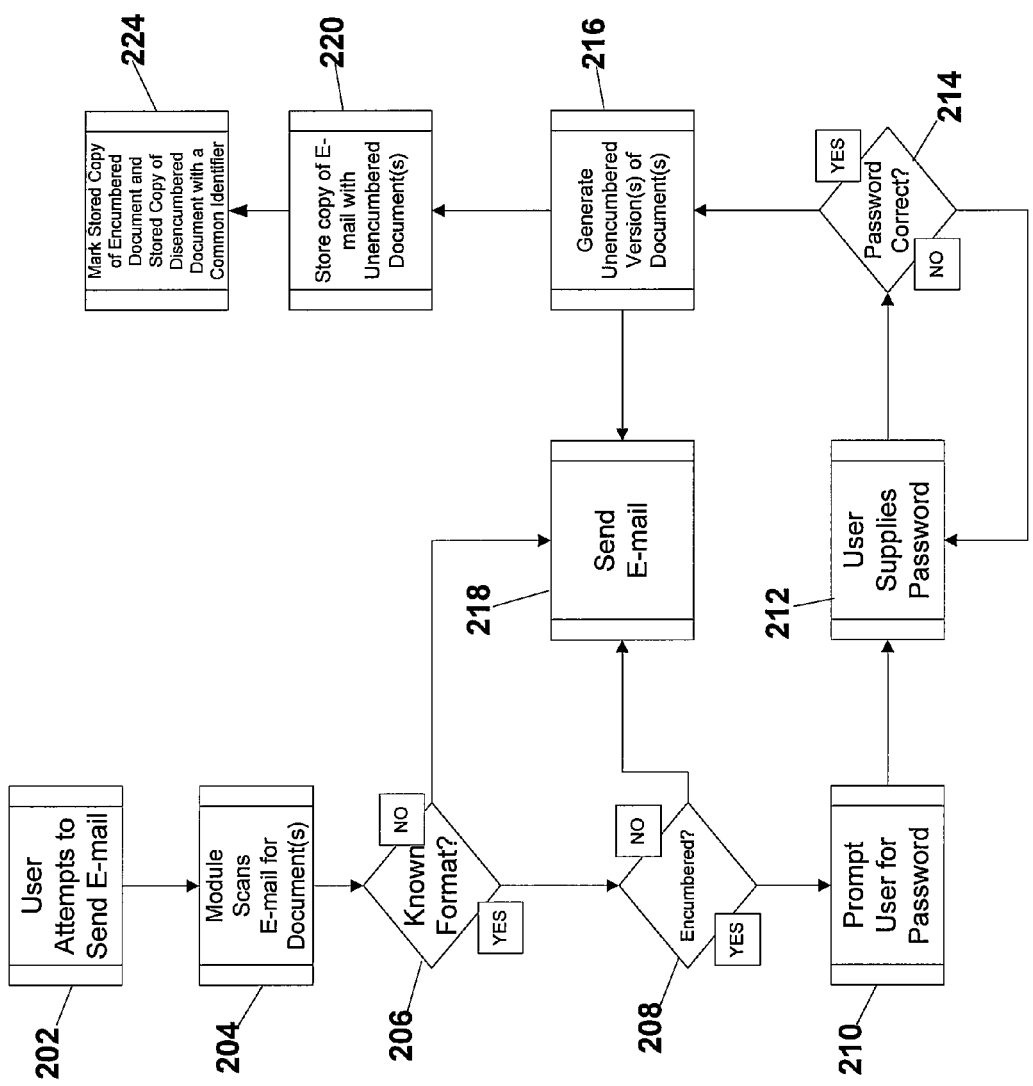
FIG. 2 includes a sample process flow diagram illustrating an example of a method or process embodiment provided in association with the invention; and, FIG. 3 includes a sample process flow diagram illustrating an example of an alternative method or process embodiment provided in association with the invention.

Referring now to FIGS. 1 and 2, an encryption management module 102 may be operatively associated with, and/or reside within, an e-mail application 104 that can be employed by one or more users in a firm 106. The e-mail application 104 may be a conventional e-mail system such as a "Microsoft Outlook" e-mail program, for example. At step 202, a user attempts to send an e-mail using the e-mail application 104. At step 204, the module 102 may scan the e-mail for attachments. If it is determined at step 206 that attachments have been found in the e-mail in a known document format (e.g., a known word processing program ("Word"), a known spreadsheet program ("Excel"), or a known presentation program ("PowerPoint"), etc.), then the discovered attachments may be checked at step 208 for native document encryption or password protection. Native document password protection refers to the use of password facilities that are part of the same application (e.g., word processing application, spreadsheet application, or presentation application) that created the document.

If it is determined at step 206 that the attachments in the e-mail are in an unrecognized document format, then module 102 can be configured to allow the e-mail to be sent without checking for encryption at step 208. If it is determined at step 206 that only some or less than all of the attachments are in a known document format, then those attachments may be checked at step 208 for native document encryption or password protection as discussed in further detail below. In at least one embodiment, the module 102 may attach an identifier onto e-mails sent having attachments with unrecognized document formats. In this embodiment, a supervisor or other employee of the firm 106, for example, may review such identified e-mails and determine whether further investigation is necessary.

If it is discovered at step 208 that encryption has been used on an attached document or that the opening of the document is otherwise encumbered by a password, the module 102 can be configured to prompt the user at step 210 for the document password. The user may then supply the password as requested at step 212. The module 102 may then employ the user-supplied password (if correct as determined at step 214) to generate a decrypted, or unencumbered, version of the document at step 216. If the user supplies the incorrect password as determined at step 214, then the module 102 can be configured to detect this condition and prompt the user one or more additional times at step 210 until the correct password is supplied. If the password is correct, then the module 102 can be configured to allow the e-mail to be sent at step 218, with the attachments in their original password-protected format, to the recipients listed on the e-mail as communicated at step 202. At step 220, the module 102 may store one or more additional copies of the decrypted e-mail and its associated attachments for storage in an e-mail archival/supervisory system 108 of the firm 106. Thus, the stored additional copies of the e-mail and attachments may include the decrypted or unencumbered versions of the e-mail and its attached documents.

In various embodiments, at steps 224 and 324, the module 102 may set a property in the decrypted e-mail or documents using a unique correlation identifier to allow the different e-mails (i.e., the encrypted version and the decrypted/unencumbered version) to be associated with each other in the e-mail archival/supervisory system 108 for future reference. For example, a code can be generated including alphabetical and/or numerical characters. This code can be randomly generated and/or the code can be compiled from information from the electronic message. For example, the code can be generated from the date and time that the message was identified, the sender's computer address, the name of the encryption management module, and/or a global unique identifier (GUID) generated by the electronic message software. Furthermore, the code can include a character, for example, that indicates whether the stored message is either encrypted or unencrypted. In these embodiments, the codes in the encumbered version and the unencumbered version of the electronic message can be identical but for this character. In at least one embodiment, the code can be inserted into a header of the electronic message so that the code can be easily reviewed by the archival system.

Figure 3:
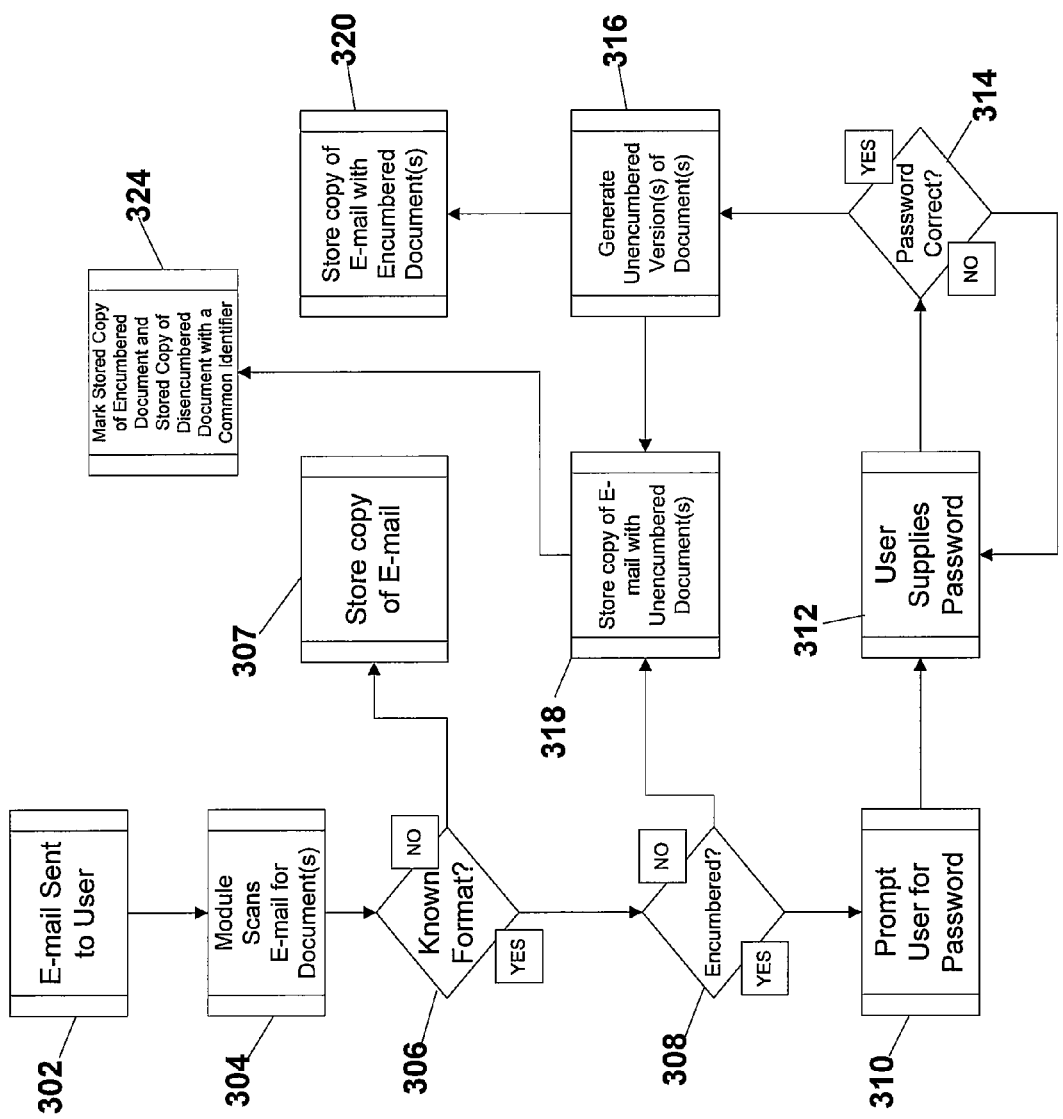

In addition, referring to FIG. 3, embodiments of the module 102 may be applied, at step 302, to e-mails received by users at the firm 106 through one or more external e-mail communication channels 110. When a user at the firm 106 attempts to open an attachment protected by a native document password, for example, the act of opening the e-mail may be intercepted by the module 102. Similar to the above, at step 304, the module 102 may scan the e-mail for encumbered documents and assess whether the documents are in a recognized document format. At step 307, if the documents are in an unrecognized format, the documents, and/or e-mail containing the documents, may be stored for review by a supervisor, for example. At step 318, if the documents are in a recognized format and are unencumbered, the module 102 may permit the user to open the unencumbered documents and store a copy of the same in the archival system 108. At step 310, if the documents are encumbered, the module 102 may prompt the user to supply the correct password, for example. At step 314, if the user does not supply the correct password, the module 102 may re-prompt the user for the correct password until it is supplied at step 312. In various embodiments, the sender and/or the recipient of the e-mail can be prompted for the password.

At step 316, the password may then be used to generate an unencumbered/decrypted copy of the document to be sent to and stored within the e-mail archival/supervisory system 108 at step 318. In addition, a copy of the encumbered documents, or the e-mail having the encumbered documents, may also be sent to and stored within the e-mail archival system 108 at step 320. Also, embodiments of the invention permit integration not just with e-mail programs, but also with other communications channels 110 that allow sending of documents via other forms of electronic messages, such as instant messaging or web-based conferencing, for example.

The inventors have recognized that conventional encryption systems do not address the problem of native document passwords/encryption as it relates to archival and/or supervisory review needs. For example, many word processing programs allow users to set document passwords to prevent unauthorized users from opening the documents. When a user chooses to use a native document password, however, and without application of the features of the present invention, the document cannot be read or searched in the e-mail archival/supervisory system 108. Conventional e-mail encryption systems merely add their own encryption to a document that is already password-protected and are not capable of preventing users from sending e-mails with attachments that have native document password protection.

Therefore, embodiments of the present invention allow users to send e-mails with encrypted documents while promoting firm compliance with regulations or laws concerning archival, supervisory review, and discovery of e-mail communications. Furthermore, aspects of the invention require little or no behavioral modification on the part of recipients. Also, those skilled in the art will appreciate that the present invention permits storage of e-mail communications and associated attachments in an unencrypted, searchable format within readily accessible e-mail archival/supervisory systems.

The examples presented herein are intended to illustrate potential and specific implementations of the present invention. It can be appreciated that the examples are intended primarily for purposes of illustration of the invention for those skilled in the art. No particular aspect or aspects of the examples is/are intended to limit the scope of the present invention.

It is to be understood that the figures and descriptions of the present invention have been simplified to illustrate elements that are relevant for a clear understanding of the present invention, while eliminating, for purposes of clarity, other elements. For example, certain operating system details and modules of network platforms are not described herein. Those of ordinary skill in the art will recognize, however, that these and other elements may be desirable in a typical computer system or e-mail application, for example. However, because such elements are well known in the art and because they do not facilitate a better understanding of the present invention, a discussion of such elements is not provided herein.

Any element expressed herein as a means for performing a specified function is intended to encompass any way of performing that function including, for example, a combination of elements that perform that function. Furthermore the invention, as defined by such means-plus-function claims, resides in the fact that the functionalities provided by the various recited means are combined and brought together in a manner as defined by the appended claims. Therefore, any means that can provide such functionalities may be considered equivalents to the means shown herein.

In general, it will be apparent to one of ordinary skill in the art that at least some of the embodiments described herein may be implemented in many different embodiments of software, firmware, and/or hardware. The software code or specialized control hardware which may be used to implement embodiments of the invention is not limiting. For example, embodiments described herein may be implemented in computer software using any suitable computer software language type such as, for example, C or C++ using, for example, conventional or object-oriented techniques. Such software may be stored on any type of suitable computer-readable medium or media such as, for example, a magnetic or optical storage medium. The operation and behavior of the invention embodiments may be described without specific reference to specific software code or specialized hardware components. The absence of such specific references is feasible, because it is clearly understood that artisans of ordinary skill would be able to design software and control hardware to implement the embodiments of the present invention based on the present description with no more than reasonable effort and without undue experimentation.

Moreover, the processes associated with the present embodiments may be executed by programmable equipment, such as computers or computer systems. Software that may cause programmable equipment to execute processes may be stored in any storage device, such as, for example, a computer system (non-volatile) memory, an optical disk, magnetic tape, or magnetic disk. Furthermore, at least some of the processes may be programmed when the computer system is manufactured or stored on various types of computer-readable media. Such media may include any of the forms listed above with respect to storage devices and/or, for example, a carrier wave modulated, or otherwise manipulated, to convey instructions that may be read, demodulated/decoded, or executed by a computer or computer system.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semi-permanent, and/or semi-temporary. A computer-readable medium may further include one or more data signals transmitted on one or more carrier waves.

A "computer" or "computer system" may be, for example and without limitation, a wireless or wireline variety of a microcomputer, microprocessor, minicomputer, server, mainframe, laptop, personal data assistant (PDA), wireless e-mail device (e.g., "BlackBerry" trade-designated devices), cellular phone, pager, processor, fax machine, scanner, or any other programmable device configured to transmit and/or receive data over a network. Computer systems and computer-based devices disclosed herein may include memory for storing certain software applications used in obtaining, processing and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM), and/or other computer-readable media.

In various embodiments of the present invention disclosed herein, a single component may be replaced by multiple components, and multiple components may be replaced by a single component, to perform a given function or functions. Except where such substitution would not be operative, such substitution is within the scope of the invention. Any servers described herein, for example, may be replaced by a "server farm" or other grouping of networked servers that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

While various embodiments of the invention have been described herein, it should be apparent that various modifications, alterations and adaptations to those embodiments may occur to persons skilled in the art with attainment of at least some of the advantages of the present invention. The disclosed embodiments are therefore intended to include all such modifications, alterations and adaptations without departing from the scope and spirit of the present invention as set forth in the attached claims.

What is claimed is:

1. A computer-assisted method for archiving an electronic message sent by a sender to a recipient, the method comprising:
   prior to sending the electronic message to the recipient:
   (a) determining, by an encryption management module on a computer system associated with the sender that comprises a processor and a memory device, whether the electronic message includes an attachment in a recognized document format when the sender attempts to send the electronic message;
   (b) determining, by the encryption management module, whether the electronic message includes an encumbered attachment when the electronic message includes the attachment in a recognized document format, wherein the electronic message has an encumbered attachment when the attachment is password protected by a native application of the attachment;
   (c) electronically prompting, by the encryption management module on the computer system, the sender for a password for access to the encumbered attachment until a correct password is supplied when it is determined that the electronic message includes a password protected encumbered attachment;
   (d) disencumbering, by the computer system, using the password entered in response to the electronic prompt, the encumbered attachment of the electronic message to create a disencumbered attachment of the electronic message;
   (e) storing a copy of the disencumbered attachment of the electronic message in an electronic archival system; and
   (f) transmitting the electronic message with the encumbered attachment to the recipient when the password provided by the sender is successfully verified as the correct password.

2. The method of claim 1, further comprising storing a copy of the encumbered attachment of the electronic message in the electronic archival system.

3. The method of claim 2, further comprising marking the stored copy of the encumbered attachment of the electronic message and the stored copy of the disencumbered attachment of the electronic message with a common identifier.

4. The method of claim 1, wherein the electronic message is an e-mail and the encumbered attachment of the electronic message is an attached file.

5. The method of claim 1, wherein the encumbered attachment of the electronic message is an attached file that is encumbered by a computer application that created the attached file.

6. The method of claim 1, wherein storing the disencumbered attachment of the electronic message comprises storing the disencumbered attachment of the electronic message only when the password provided by the sender is successfully verified as correct.

7. A non-transitory computer-readable device having instructions stored thereon which, when executed by a processor on a computer system associated with a sender, cause the processor to:
   prior to sending an electronic message to a recipient:
   (a) determine, by an encryption management module of the non-transitory computer-readable device, whether the electronic message includes an attachment in a recognized document format when the sender attempts to send the electronic message;
   (b) determine, by the encryption management module, whether the electronic message includes an encumbered attachment when the electronic message includes the attachment in a recognized document format, wherein the electronic message is associated with the sender and the recipient, and wherein the electronic message has an encumbered attachment when the attachment is password protected by a native application of the attachment;
   (c) electronically prompt, by the encryption management module, the sender for a password for access to the encumbered attachment until a correct password is supplied when it is determined that the electronic message includes a password protected encumbered attachment;
   (d) disencumber, using the password entered in response to the electronic prompt, the encumbered attachment of the electronic message to create a disencumbered attachment of the electronic message;
   (e) store a copy of the encumbered attachment of the electronic message in a disencumbered format in an electronic archival system; and
   (f) transmit the electronic message with the encumbered attachment to the recipient when the password provided by the sender is successfully verified as the correct password.

8. The non-transitory computer-readable device of claim 7, having further stored thereon instructions which when executed by the processor cause the processor to store a copy of the encumbered attachment of the electronic message in the electronic archival system.

9. The non-transitory computer-readable device of claim 8, having further stored thereon instructions which when executed by the processor cause the processor to mark the stored copy of the encumbered attachment of the electronic message and the stored copy of the disencumbered portion attachment of the electronic message with a common identifier.

10. The non-transitory computer-readable device of claim 7, wherein the electronic message is an e-mail and the encumbered attachment of the electronic message is an attached file.

11. The non-transitory computer-readable device of claim 7, wherein the encumbered attachment of the electronic message is an attached file that is encumbered by a computer application that created the attached file.

12. The non-transitory computer-readable device of claim 7, having further stored thereon instructions which, when executed by the processor, cause the processor to store the disencumbered attachment of the electronic message only when the password provided by the sender is successfully verified as correct.

13. A system comprising:
   a computer system comprising a processor and a memory device; and
   an electronic archival system in communication with the computer system, wherein the computer system is programmed to:
   prior to sending an electronic message to a recipient:

(a) determine, by an encryption management module on the computer system, whether the electronic message includes an attachment in a recognized document format when a sender attempts to send the electronic message;

(b) determine, by the encryption management module, whether the electronic message includes an encumbered attachment when the electronic message includes the attachment in a recognized document format, wherein the electronic message is associated with the sender and the recipient, and wherein the electronic message has an encumbered attachment when the attachment is password protected by a native application of the attachment;

(c) electronically prompt, by the encryption management module, the sender for a password for access to the encumbered attachment until a correct password is supplied when it is determined that the electronic message includes a password protected encumbered attachment;

(d) disencumber, using the password entered in response to the electronic prompt, the encumbered attachment of the electronic message to create a disencumbered attachment of the electronic message;

(e) transmit the electronic message with the encumbered attachment to the recipient when the password provided by the sender is successfully verified as the correct password; and (f) store a copy of said electronic message in a disencumbered format in the electronic archival system.

14. The system of claim 13, wherein the electronic archival system stores a copy of the encumbered attachment of the electronic message.

15. The system of claim 14, wherein the memory device further stores instructions which when executed by the processor cause the processor to mark the stored copy of the encumbered attachment of the electronic message and the stored copy of the disencumbered attachment of the electronic message with a common identifier.

16. The system of claim 13, wherein the electronic message is an e-mail and the encumbered attachment of the electronic message is an attached file.

17. The system of claim 13, wherein the encumbered attachment of the electronic message is an attached file that is encumbered by a computer application that created the attached file.

18. The system of claim 13, wherein the memory device further stores instructions which when executed by the processor cause the processor to store the disencumbered attachment of the electronic message only when the password provided by the sender is successfully verified as correct.

* * * * *